Fig. 3.

F. ENGEL.
MACHINE FOR PASTING STORAGE BATTERY GRIDS.
APPLICATION FILED APR. 26, 1909.

1,039,715.

Patented Oct. 1, 1912.

Witnesses:

Inventor:
Frank Engel

UNITED STATES PATENT OFFICE.

FRANK ENGEL, OF BUFFALO, NEW YORK, ASSIGNOR, BY MESNE ASSIGNMENTS, TO THE UNITED STATES LIGHT & HEATING COMPANY, OF NEW YORK, N. Y., A CORPORATION OF MAINE.

MACHINE FOR PASTING STORAGE-BATTERY GRIDS.

1,039,715.  Specification of Letters Patent.  Patented Oct. 1, 1912.

Application filed April 26, 1909. Serial No. 492,155.

*To all whom it may concern:*

Be it known that I, FRANK ENGEL, a citizen of the United States, residing at Buffalo, in the county of Erie and State of New York, have invented a certain new and useful Improvement in Machines for Pasting Storage-Battery Grids, of which the following is a specification.

My invention relates to pasting machines and in the form selected to illustrate the invention the machine is particularly adapted to apply paste to the grids or paste carrying elements employed in storage batteries. These grids may assume various forms, but in the construction selected for illustration the grid is of open work or skeleton form and adapted to carry the paste in such manner that the two opposite sides will form active surfaces.

The object of my invention is to provide a machine for applying paste to objects typified by such a battery grid, and to this end my invention consists in certain novel devices and combinations of devices which will be hereinafter more particularly described and claimed.

In the form of mechanism chosen for illustrating the invention.

Similar numerals refer to similar parts throughout the several views.

Figure 5:
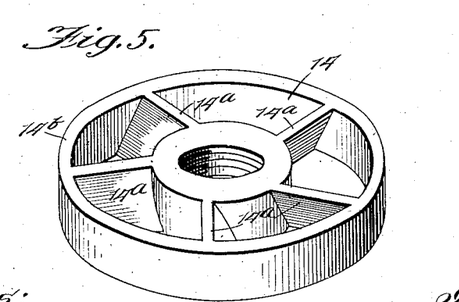
Fig. 5 is a perspective view of the preferred form of paste wheel.

The paste receptacle consists preferably of two castings 10, 10, cylindrical in cross section and arranged end to end in upright position upon any suitable base or stand 12. At the side is an opening 13 through which the grid may be introduced to receive the paste. Above and below the opening are paste wheels 14 secured to the shafts 15 preferably by means of threads running in such direction that the resistance of the paste will tend to tighten the wheels in place. The preferred form of paste wheel is shown in perspective in Fig. 5, the blades 14$^a$ being arranged at such an angle that the rotation of the wheel will advance the paste toward the grid. The edges next to the grid serve to scrape off the excess paste from the grid and thus produce plates having uniform thickness and smooth, parallel faces. It is desirable that the outer ends of the blades be braced by a ring 14$^b$ which is preferably of such diameter as to fit the cylinder and thus perform the additional function of holding the wheels and the shafts 15 centered within the cylinder. Said shafts are rotated by gearing of suitable construction, for example the wheels 16, rigidly secured to said shafts and meshing with pinions 17 driven by bevel gears 18 meshing with a common bevel pinion 19 driven from a band wheel 20. By preference said shafts rotate in opposite directions thus producing a peculiarly efficient action of the wheels 14 in applying the paste.

Figure 2:
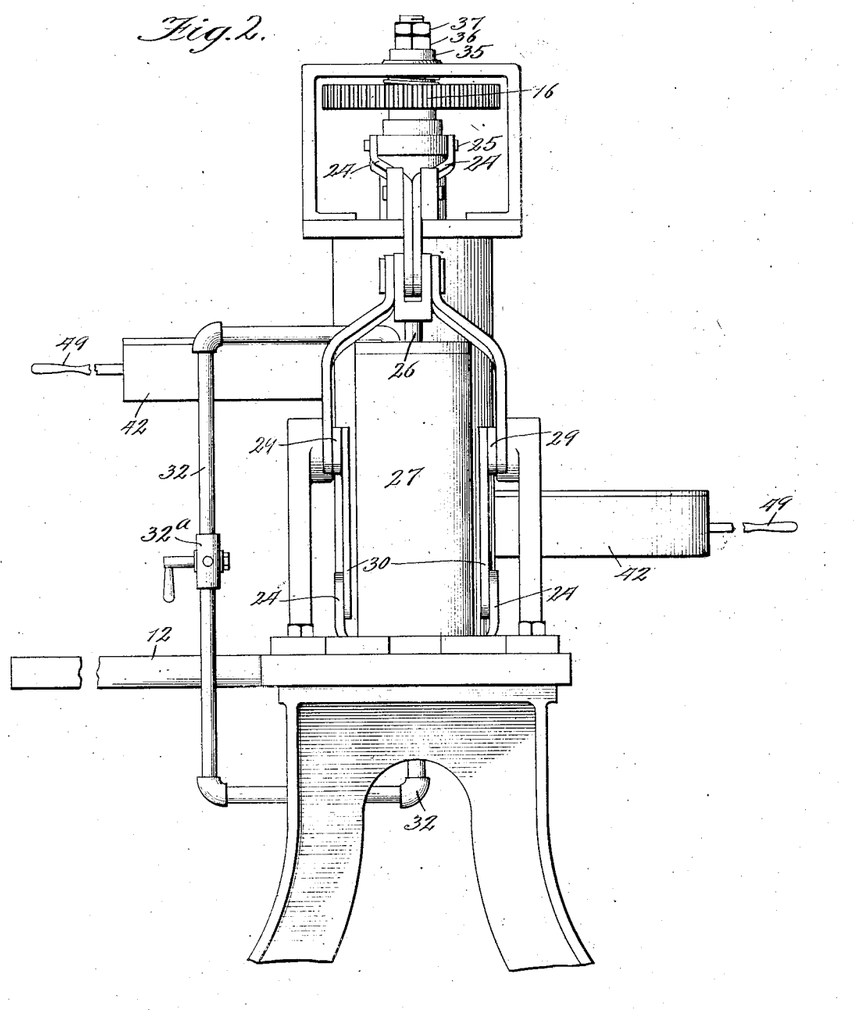
Fig. 2 is an end view thereof looking from the left side of Fig. 1.

The paste is advanced toward the paste wheels by means of plungers 23 which fit within the cylinders and surround the shafts 15. In the preferred construction they are operated by levers which in the present instance comprises the levers 24 fulcrumed at the stationary pivots 25. The upper one of the levers 24 is operated directly by the piston rod 26 of the fluid-pressure cylinder 27, while the lower one of said levers is operated indirectly by said piston rod, the motion of said rod being transmitted by the intermediate levers 28, 29 and 30. Lever 30 is fulcrumed at the stationary pivot 31 and the arrangement is such that a movement of the piston rod 26 will cause the plungers to move simultaneously in opposite directions. The preferred operating fluid in the cylinder 27 is air introduced through a pipe 32 or other suitable duct leading to the top and bottom of the cylinder as best shown in Fig. 2. The flow of pressure medium to raise or lower the piston rod 26 is controlled by a valve 32ª.

The pressure of the paste on the paste wheels 14 caused by the action of the plungers 23 tends to draw the shafts 15 inward. This tendency is overcome by end bearings on said shafts, these consisting preferably of ball bearing members 35 and 36, the inner member 35 being held stationary by the machine frame and the outer member 36 being screwed to the shaft and there locked by a lock nut 37.

The paste is introduced into the cylinder preferably through doors 40 located just back of the paste wheels. In the form illustrated, these doors when closed form a portion of the cylinder (see especially Fig. 7) and also act as plungers adapted to move back and forth in troughs 41 leading to the doorways in said cylinders. Said troughs are provided with removable covers 42 to admit of the introduction of a fresh supply of paste into said troughs. Said covers may be held closed by any suitable means such as the latches 43 pivoted at 44 to said covers and adapted to be engaged by the stationary catches 45 on the sides of the trough, see especially Figs. 1, 4, 6 and 7. In the preferred embodiment of the invention, these troughs are curved about the stationary pin 48 as a center, said pin forming the fulcrum of a lever 49 articulately connected to a link 50, said link, in turn being articulately connected to the plunger-door 40. A catch 51 is provided for holding the lever 49 stationary to keep said plunger-doors in proper position when closed. As a result of this construction when a fresh charge of paste is to be introduced the operator removes the cover 42, draws back the plunger-door 40, puts a supply of paste in the trough in front of it, replaces the cover, swings the lever 49 to closed position and locks it there by catch 51.

Figure 7:
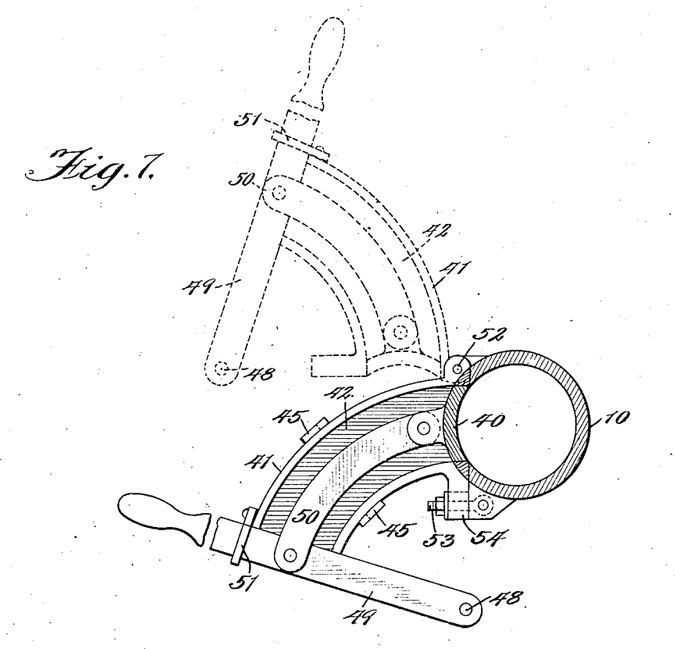
Fig. 7 is a plan of one of the charging troughs and connected parts.

In the best form of machine, the entire trough is adapted to be thrown back to the position shown in dotted lines Fig. 7 to permit the parts to be cleaned. The trough is pivoted upon a pin 52 at the side of the cylinder, which acts as a hinge. Said trough is held in closed or normal position by suitable locking means such as the lever 53 adapted to engage the trough lug 54.

Figure 8:
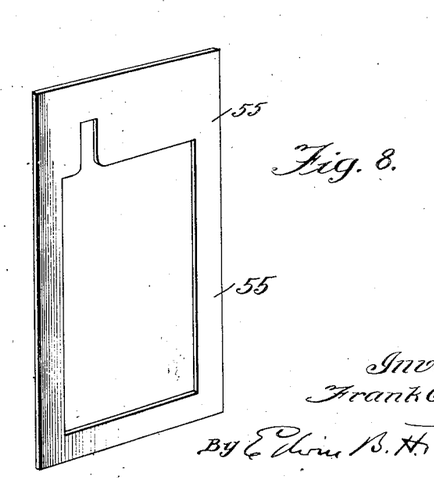
Fig. 8 is a perspective view of the grid holder and Fig. 9 is a perspective view of a portion of a grid of a form adapted to be pasted by this machine.
Figure 9:
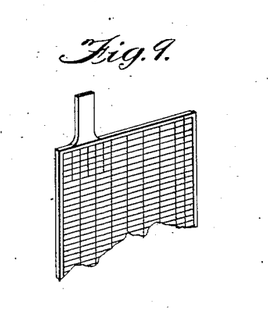

The grid, which for the sake of illustration is selected as the object to be pasted, is indicated in Fig. 9, although it will be understood that the object to be pasted may assume various forms. A holder adapted to this form of grid is shown separately in Fig. 8 and indicated by the reference numeral 55. Guides 56, (see especially Figs. 1 and 6) are provided to guide the grid holder to the space between the paste wheels 14.

Figure 4:
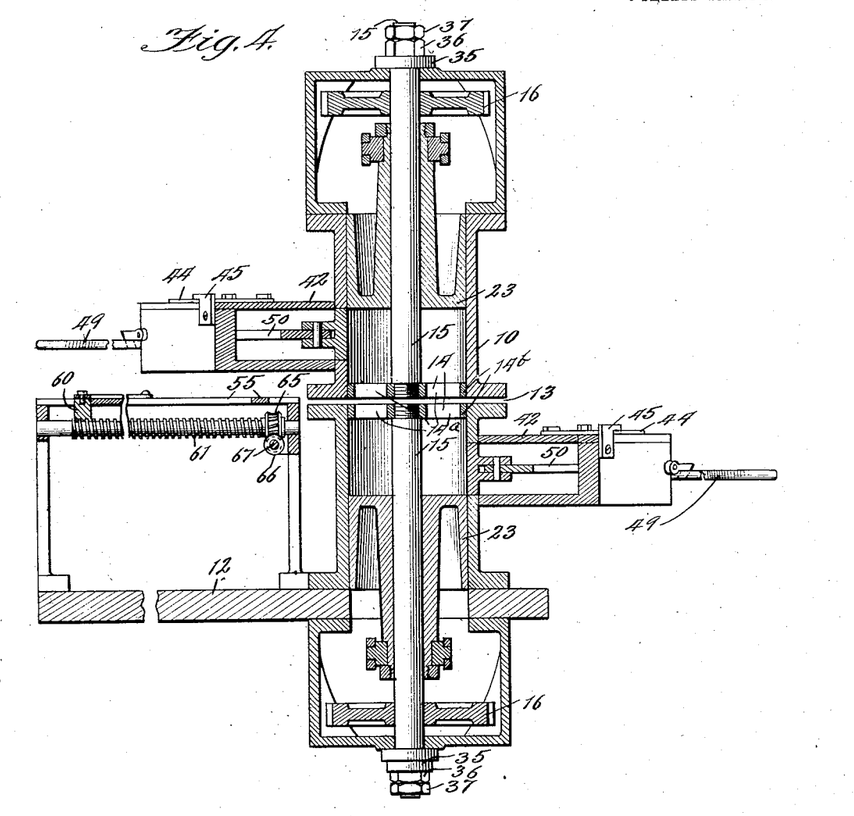
Fig. 4 is a sectional elevation taken on line 4—4 Fig. 1.

The preferred means for advancing the grid holder is the nut 60 which rides upon the rotary screw 61 and is adapted to push the holder forward when the screw is rotated. In the best arrangement the nut is not secured to the grid holder but merely pushes it forward, and after the nut has thus pushed the grid holder a certain distance the nut is retracted and another grid holder is introduced behind the first and pushes the first grid holder on through the machine. It is desirable that the nut engage the screw from only one side, the remaining side being cut away as shown in Fig. 4 to admit of said nut being lifted away from the screw to thus permit it to be quickly retracted even though the screw continues to rotate in a direction to advance the nut.

Figure 1:
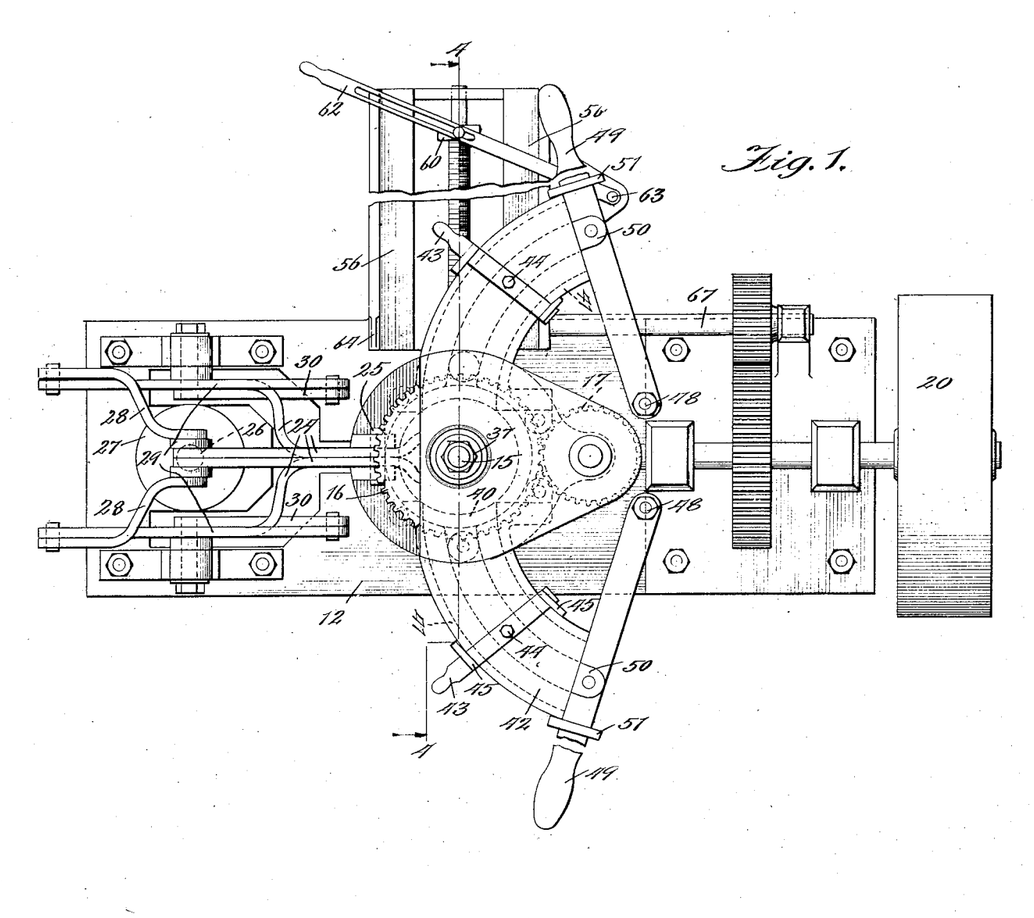
Figure 1 is a top plan view of the complete machine.
Figure 3:
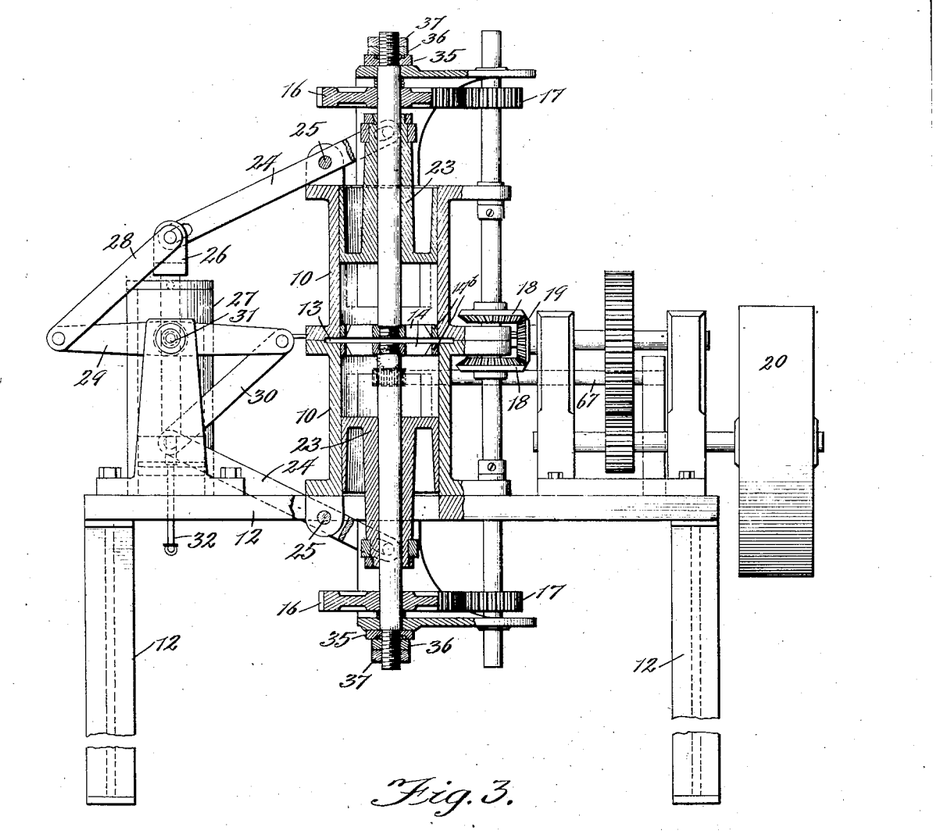
Fig. 3 is a side elevation of the machine, the paste receptacle and associated parts being shown in section.
Figure 6:
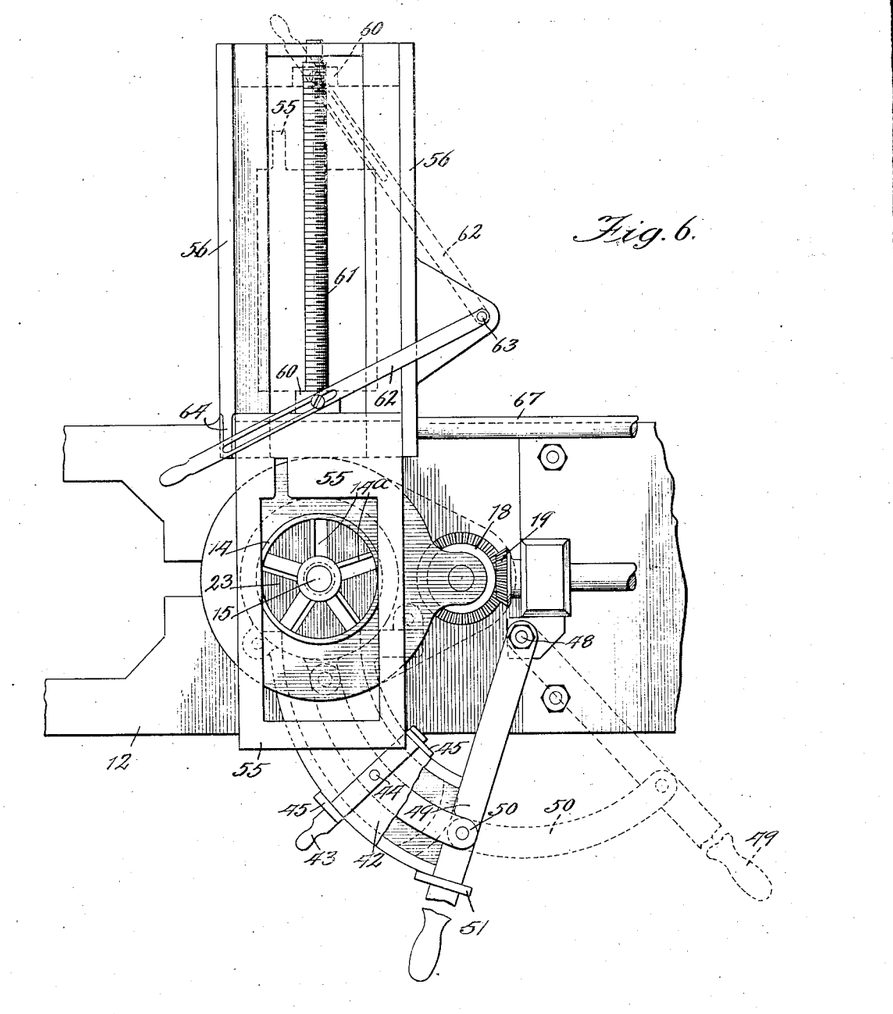
Fig. 6 is a plan view showing the parts as they appear after the upper cylinder and contents have been removed.

A slotted lever 62 is fulcrumed at the stationary pin 63 as best shown in Figs. 1 and 6 and is also connected to said nut 60 and enables the operator to manipulate the nut readily. A lifting cam 64 is located in convenient position preferably on one of the guides 56 as shown and is adapted to raise the lever 62 and thus lift the nut clear of the screw when it has approached the end of said screw. This automatically prevents breakage and relieves the operator of the close attention which would otherwise be required. Screw 61 is driven by means of a gear 65 thereon, as shown in Fig. 4, this gear being driven by a worm 66 on the shaft 67. Said shaft is in gear connection with the band wheel 20 as best shown in Figs. 1 and 3.

In operation, the operator first manipulates the controlling valve 32ª in the pipe 32 in such manner as to lower the piston rod 26. This retracts the plungers 23 in the paste cylinders preparatory to the introduction of a supply of paste. The operator then removes the trough covers 42 and retracts the plunger-doors 40 by means of the levers 49 and places a charge of paste in the troughs in front of said doors. He then replaces the trough covers and moves the doors to closed position, thus forcing a charge of paste into the cylinders behind the paste wheels 14. He also retracts the nut 60 by means of the lever 62, swinging the latter to the position shown in dotted lines in Fig. 6. He then adjusts a grid holder in position as shown in dotted lines and inserts a grid into the holder. The machine is then ready to be started. As soon as the power is turned on it causes the paste wheels 14 to rotate and also causes the screw 61 to rotate to advance the grid and grid holder. At the same time the operator manipulates the valve 32ª to introduce the pressure medium into the cylinder 27 in such manner as to raise the piston rod 26 and thus move the plungers 27 in such manner as to raise the piston rod 26 and thus move the plungers 23 toward the paste wheels 14 to supply paste to them and the grid. After the machine is thus started the operation is practically continuous, until the supply of paste has been exhausted, whereupon the cylinders may be refilled and the operation repeated.

Having thus described my invention, what I claim as new, and desire to secure by Letters Patent, is:

1. A pasting machine comprising a support for the object to be pasted, means for advancing paste toward said object and means adapted to move over the surface of said object to pack the paste thereinto.

2. A pasting machine comprising a support for the object to be pasted, means for advancing paste toward said object and a revolving blade adapted to move over the surface of said object to pack the paste thereinto and to trim off the surplus.

3. A pasting machine comprising a support for the object to be pasted, means for advancing paste toward said object and radially arranged revolving blades adapted to move over the surface of said object to pack the paste thereinto and to trim off the surplus.

4. A pasting machine comprising a support for the object to be pasted, means for advancing paste toward said object, means adapted to pack the paste into said object and trim off the surplus and means for moving said object relatively to said support.

5. In a machine for applying paste, means for containing the paste, and means within said containing means for forcing the paste therefrom onto the object to be pasted simultaneously from opposite sides of said object.

6. In a machine for applying paste, means for containing the paste, and means including two members adapted to have the object to be pasted pass between them for applying the paste thereto.

7. In a machine for applying paste, means for containing the paste, and two rotary paste-applying members adapted to have the object to be pasted pass between them and adapted to rotate about a common axis.

8. In a machine for applying paste, means for containing the paste, and two rotary paste-applying members adapted to operate simultaneously upon opposite sides of the object to be pasted, and adapted to rotate about a common axis, said members being located within said means.

9. In a machine for applying paste, means for containing the paste and two paste-applying members adapted to rotate about a common axis and to advance the paste in a direction parallel to said axis, said members being oppositely placed to permit the object to be pasted to pass between them.

10. In a machine for applying paste, means for containing the paste, rotary paste-applying members and means for rotating them in opposite directions, said members applying paste to opposite sides of the same article.

11. In a pasting machine, a cylinder adapted to contain paste, means within the cylinder for advancing the paste toward the object to be pasted and means for guiding said object past said cylinder during the pasting operation.

12. In a pasting machine, a cylinder for the paste, said cylinder having an opening therein for exit of paste, a plunger for advancing the paste in said cylinder, means for guiding the object to be pasted past an opening in said cylinder to receive paste therefrom, and means operating in timed relation with said guiding means for advancing said plunger.

13. In a pasting machine, a cylinder for containing the paste, two plungers in said cylinder and means for moving said plungers toward and from each other, said cylinder being adapted to permit the object to be pasted to pass into it transversely at a point between said plungers.

14. In a pasting machine, the combination of two paste applying members adapted to have the object to be pasted pass between them, and means for supplying paste to said paste applying members.

15. In a pasting machine, the combination of two paste applying members adapted to have the object to be pasted pass between them, a cylinder for containing the paste and plungers adapted to move toward each other in said cylinder for supplying paste to said paste-applying members.

16. In a pasting machine, a receptacle for the paste, means for advancing the paste therein, and means for applying the paste to the object to be pasted as the paste is advanced to said applying members, said second means being located within said receptacle.

17. In a pasting machine, a receptacle for the paste, means for advancing the paste therein, and a rotary member having a blade for applying the paste to the object to be pasted, the axis of rotation being parallel to the direction of advance of the paste toward said rotary member and said blade being oblique to said axis of rotation.

18. In a pasting machine, a cylinder for the paste, a plunger therein and a rotary member in said cylinder having blades for applying the paste to the object to be pasted, the axis of rotation being parallel to the movement of the plunger and the blades oblique thereto and said blades being secured at their ends to a ring adapted to fit within said cylinder.

19. In a pasting machine, two paste applying members adapted to rotate about a common axis and located apart to permit the object to be pasted to pass between them, a paste-containing cylinder arranged parallel to the axis of the paste-applying members and plungers for supplying the paste in said cylinders to said paste applying members.

20. In a pasting machine, a rotary member having blades for applying the paste, said blades being oblique to the axis of rotation, and separate to permit the paste to pass them in an axial direction and a cylinder and plunger for forcing the paste past said rotary members in an axial direction.

21. In a pasting machine, a paste receptacle having an opening through which the object to be pasted may receive paste, means for passing the object to be pasted past said opening, and means in said cylinder for applying the paste to the object to be pasted.

22. In a pasting machine, a paste receptacle having an opening through which the object to be pasted may receive paste, means for guiding the object to be pasted past said opening, a rotary member in the receptacle at said opening for applying paste to said object and means for supplying paste to said rotary member.

23. In a pasting machine, a paste receptacle having an opening through which the object to be pasted may receive paste, means for guiding the object to be pasted, past said opening, a rotary member in the receptacle at said opening for applying paste to said object, and a plunger in said receptacle back of said paste-applying means for supplying paste thereto.

24. In a pasting machine, a paste receptacle having an opening through which the object to be pasted may receive paste, means for guiding the object to be pasted past said opening, means for applying the paste, including a rotary member at said opening in the receptacle, and driving means common to said guiding means and rotary member.

25. In a grid pasting machine, a paste receptacle having an opening through which the grid may receive paste, means for moving the grid past said opening, and means for forcing the paste onto said grid.

26. In a grid pasting machine, a paste receptacle having an opening through which the grid may receive paste, means for guiding the grid past said opening, means for advancing the grid and means for applying the paste to the grid.

27. In a grid pasting machine, a paste receptacle having an opening through which the grid may receive paste, means including a rotatable screw and a non rotatable nut thereon for moving the grid past said opening, and means including parts located within the cylinder for applying the paste to the grid.

28. In a grid pasting machine, a paste receptacle having an opening through which the grid may receive paste, means for advancing said grid to the opening to receive paste therefrom, means including a rotary member located at said opening for applying paste to the grid, and means common to said grid, advancing means and rotary members for operating them.

29. In a pasting machine, a paste receptacle having an opening therein, and means for conveying the object to be pasted past said opening for receiving the paste, said conveying means comprising a holder for the object to be pasted, and means for guiding said holder.

30. In a pasting machine, a paste receptacle having an opening therein, and means for conveying the object to be pasted to said opening for receiving the paste, said conveying means comprising a holder for the object to be pasted, means for guiding said holder and means independent of said paste receptacle for moving said holder upon its guides.

31. In a grid pasting machine, a paste receptacle having an opening through which the grid may receive paste, a grid holder, means for guiding and advancing the same, and means for applying the paste to the grid.

32. In a grid pasting machine, a paste receptacle having an opening therein, a holder for the grid, guides for guiding the holder to said opening in the paste receptacle, a nut for advancing said holder, a screw for advancing said nut, and means for rotating said screw.

33. In a grid pasting machine, a paste receptacle having an opening through which the grid may receive paste, a grid holder, a rotary member in said cylinder for applying paste to the grid, means for guiding said grid holder, a rotary screw and a nut on said screw for moving said holder.

34. In a grid pasting machine, a paste receptacle having an opening therein, a holder for the grid, guides for guiding the holder to said opening in the paste receptacle, a nut for advancing said holder, a screw for advancing said nut, means for rotating said screw and a handle for retracting said nut, said nut engaging said screw from one side only to permit disengagement from said screw.

35. In a pasting machine, a paste cylinder having an opening therein, means at said opening for applying paste to the object to be pasted, means for guiding the object to be pasted to said paste applying means and a plunger in said cylinder for forcing the paste to said paste applying means and driving means common to said guiding means and paste applying means.

36. In a pasting machine, a paste cylinder having an opening through which the object to be pasted may receive paste, and a plunger in said cylinder, a part of the side of the cylinder being removable to permit the introduction of paste.

37. In a pasting machine, a paste cylinder having an opening for exit of paste to the object to be pasted, a plunger in said cylinder, and a trough at the side of said cylinder, said cylinder having a removable part adapted to slide in said trough for forcing paste from said trough into said cylinder.

38. In a pasting machine, a paste cylinder having an opening for exit of paste to the object to be pasted, a plunger in said cylinder, a trough at the side of said cylinder, and a removable cover to said trough, said cylinder having a removable part adapted to make a sliding fit within said trough for forcing paste therefrom into the cylinder.

39. In a pasting machine, a paste receptacle having an opening through which the object to be pasted may receive paste, a grid holder for moving the object to be pasted past said opening, a rotary paste-applying member at said opening, a plunger in said cylinder, and driving means common to said grid holder and paste-applying member.

40. In a grid pasting machine, in combination, a receptacle for paste, means therein for applying the paste to the grid, a plunger back of said paste-applying member for supplying paste thereto, and fluid operated means for advancing said plunger.

41. In a grid pasting machine, in combination, a cylinder for paste having an opening through which a grid may be passed into it from the side intermediate the ends of the cylinder, paste wheels located in the cylinder in position to apply paste to both sides of the grid simultaneously, and means for supplying paste to said paste wheels simultaneously, said supplying-means being fluid-operated from a common source whereby the pressure on both sides of the grid may be maintained equal.

42. In a grid pasting machine, in combination, a cylinder for paste having an opening through which a grid may be passed into it from the side intermediate the ends of the cylinder, paste wheels located in the cylinder in position to apply paste to both sides of the grid simultaneously, plungers in said cylinder back of said paste wheels, links for operating said plungers and fluid-operated means for operating said links.

43. In a grid pasting machine, in combination, a paste cylinder, means for moving the grid transversely across said cylinder, a plunger for forcing paste toward the grid, a trough at the side of said cylinder, and a door in the side of said cylinder registering with said trough, said door being adapted to fit slidingly in said trough for the purpose described.

44. In a grid pasting machine, in combination, a paste-cylinder, means for moving the grid transversely across said cylinder, a plunger for forcing paste toward the grid, a trough at the side of said cylinder, a door in the side of said cylinder registering with said trough and adapted to fit slidingly within said trough and a pivoted lever for operating said door.

45. In a grid pasting machine, in combination, a paste-cylinder, means for moving the grid transversely across said cylinder, a plunger for forcing paste toward the grid, a trough at the side of said cylinder, a door in the side of said cylinder registering with said trough and adapted to fit slidingly therein, said trough having a removable cover for the introduction of paste.

46. In a pasting machine, a cylinder, and means therein adapted to apply paste to the object to be pasted, an opening in the side of said cylinder for the introduction of paste, a trough hinged to the cylinder in position to supply paste to said opening, and means for closing said opening.

47. In a pasting machine, a cylinder, and means therein adapted to apply paste to the object to be pasted, an opening in the side of said cylinder for the introduction of paste, a trough hinged to the cylinder in position to supply paste to said opening, and a door adapted to fit said opening and also adapted to fit slidingly within said trough.

48. In a grid pasting machine, a cylinder, and means therein adapted to apply paste to the grid, a rotary screw, a half nut riding thereon for advancing the grid, and a lever connected to said nut for raising from the screw and returning it to initial position.

49. In a grid pasting machine, a cylinder and means therein adapted to apply paste to the grid, a rotary screw, a half nut riding thereon for advancing the grid, a lever connected to said nut for raising from the screw and returning it to initial position, and a stationary cam for automatically raising said lever to lift the nut when the latter has traveled to a predetermined position.

50. In combination, a cylinder composed of two alined paste cylinders adapted to have a grid pass transversely between them, wheels in the cylinders for applying the paste, means for rotating said wheels, plungers for supplying the paste to said wheels, means for operating said plungers, a grid holder, and means for advancing it, substantially as described.

51. A machine for applying paste to a battery grid comprising means for forcing the paste into the grid and additional means for packing and trimming off the paste.

52. A machine having means for filling a battery grid with paste and having means for scraping off the surplus paste from the surface of the grid.

53. A machine for filling battery grids comprising means for supporting the edges of said grids, and means for forcing paste into said grid from opposite sides thereof.

54. In a pasting machine, a plurality of propelling devices arranged to force battery paste toward a common point from opposite directions, whereby a battery grid may be filled from opposite sides simultaneously.

55. A battery grid-filling machine having means for advancing a grid and having means for packing said grid with paste as it advances, said latter means also scraping and smoothing the surface of the grid.

56. A machine for filling battery grids comprising means for continuously advancing a series of grids past two oppositely disposed paste outlets and having means for packing and smoothing both sides of the grids as they advance.

57. A machine for filling accumulator grids with paste, characterized by oppositely disposed openings, guides arranged adjacent said openings whereby empty grids may be guided past said openings in continuous succession, and means for packing paste into said grids as they pass said openings.

FRANK ENGEL.

Witnesses:
HERTHA GLAWATZ,
ANNA GLAWATZ.